United States Patent
Zhang et al.

(10) Patent No.: US 10,396,629 B1
(45) Date of Patent: Aug. 27, 2019

(54) INTEGRATED SHAFT LIQUID-COOLING FOR ELECTRIC MOTOR WITH GEARBOX

(71) Applicant: Vepco Technologies, Chino, CA (US)

(72) Inventors: Guoliang Zhang, Chino, CA (US); Jun Tao Lin, Chino, CA (US); Yan Sun, Chino, CA (US)

(73) Assignee: VEPCO TECHNOLOGIES, Chino, CA (US)

( * ) Notice: Subject to any disclaimer, the term of this patent is extended or adjusted under 35 U.S.C. 154(b) by 314 days.

(21) Appl. No.: 15/629,065

(22) Filed: Jun. 21, 2017

Related U.S. Application Data

(60) Provisional application No. 62/354,047, filed on Jun. 23, 2016.

(51) Int. Cl.
   *H02K 9/19*  (2006.01)
   *H02K 1/32*  (2006.01)
   *H02K 5/18*  (2006.01)

(52) U.S. Cl.
   CPC .................. *H02K 9/19* (2013.01); *H02K 1/32* (2013.01); *H02K 5/18* (2013.01)

(58) Field of Classification Search
   CPC ............... H02K 9/19; H02K 1/32; H02K 5/18
   See application file for complete search history.

(56) References Cited

U.S. PATENT DOCUMENTS

| | | | |
|---|---|---|---|
| 2,743,384 A | 4/1956 | Turner | |
| 2,894,155 A * | 7/1959 | Labastie | H02K 9/19 |
| | | | 188/264 D |
| 4,137,472 A | 1/1979 | Workman | |
| 4,240,000 A | 12/1980 | Harano et al. | |
| 4,406,959 A | 9/1983 | Harano et al. | |
| 4,959,570 A | 9/1990 | Kakamura et al. | |
| 5,199,325 A | 4/1993 | Reuter et al. | |
| 5,214,325 A | 5/1993 | Matson et al. | |
| 5,519,269 A | 5/1996 | Lindberg | |
| 5,934,040 A | 8/1999 | Chen | |

(Continued)

*Primary Examiner* — Mohamad A Musleh
(74) *Attorney, Agent, or Firm* — Dickinson Wright PLLC

(57) ABSTRACT

An electric motor comprising a gearbox housing containing a gearbox, a sump, a first-stage shaft rotatably mounted in the gearbox housing, and a rotatably-mounted motor shaft coupled to the first-stage shaft of the gearbox. The first-stage shaft has an internal passageway defined along the longitudinal axis of the first-stage shaft and extending between opposite first and second ends thereof. At the second end the internal passageway communicates with the sump. The rotatably-mounted motor shaft is coupled to the first end of the first-stage shaft. The motor shaft has an internal passageway defined along the longitudinal axis of the motor shaft and extending between opposite first and second ends thereof. At the second end thereof, the internal passageway of the motor shaft communicates with the internal passageway of the first-stage shaft at the first end thereof. The internal passageways of the motor shaft and first-stage gearbox shaft define a coolant path for liquid coolant, the coolant path beginning at the first end of the motor shaft and proceeding entirely through the internal passageways of the motor shaft and the first-stage shaft, and the coolant path terminating at the sump, where coolant exiting the internal passageway of the first-stage shaft at the second end thereof collects.

3 Claims, 2 Drawing Sheets

(56) References Cited

U.S. PATENT DOCUMENTS

| | | |
|---|---|---|
| 6,528,909 B1 | 3/2003 | Kan et al. |
| 6,727,609 B2 | 4/2004 | Johnsen |
| 7,156,195 B2 | 1/2007 | Yamagishi et al. |
| 7,489,057 B2 | 2/2009 | Zhou et al. |
| 8,022,582 B2 | 9/2011 | Dames et al. |
| 8,896,167 B2 | 11/2014 | McKinzie et al. |
| 8,970,075 B2 | 3/2015 | Rippel |
| 9,306,433 B2 * | 4/2016 | Sten .................. H02K 9/193 |
| 9,762,106 B2 * | 9/2017 | Gauthier ............... H02K 9/19 |
| 2008/0024020 A1 * | 1/2008 | Iund ..................... H02K 5/20 |
| | | 310/61 |
| 2016/0164378 A1 | 6/2016 | Gauthier et al. |

* cited by examiner

INTEGRATED SHAFT LIQUID-COOLING FOR ELECTRIC MOTOR WITH GEARBOX

CROSS-REFERENCE TO RELATED APPLICATIONS

This application is related to, and claims the benefit of priority from, U.S. Provisional Application Ser. No. 62/354,047, filed 23 Jun. 2016, the disclosure of which is incorporated herein by reference in its entirety.

FIELD OF THE INVENTION

The present invention relates to electric motors and, more particularly, cooling of the rotor shaft of the electric motor, bearing systems in the electric motor, the first-stage shaft of gearbox, and the whole gearbox enclosure.

BACKGROUND

Electric vehicles have been a fast-growing area of interest for the automotive industry in the recent years. One of the issues in electric-motor drive-trains is that they generate significant heat through rotation of the rotor shaft. Traditionally, this heat is dissipated by conducting it through the motor enclosure and gearbox enclosure. From there, both enclosures are cooled by convection.

In the past ten years there have been some efforts at motor cooling which involves the cooling the rotor. However, these efforts have so far proved incompletely satisfactory.

Certain rotor cooling directs liquid into rotor of electric motor from one side of the rotor and have the liquid returning at the same side of the rotor. The liquid has to travel from one side to the other side of the rotor and return back to the liquid inlet side for draining. The drawbacks of this cooling path is the twice long path for the cooling liquid to travel and it only removes the rotor heat generation with additional liquid pressure drop. Also this cooling path does not remove the heat generated in the first stage shaft of the gearbox and the heat generation from the coupling where the electric motor couples with the gearbox.

Therefore, a need continues to exist for a more effective cooling system for electric motors.

BRIEF SUMMARY OF THE INVENTION

By way of summary, there is disclosed herein an electric motor comprising a gearbox housing containing a gearbox, a sump, a first-stage shaft rotatably mounted in the gearbox housing, and a rotatably-mounted motor shaft coupled to the first-stage shaft of the gearbox. The first-stage shaft has an internal passageway defined along the longitudinal axis of the first-stage shaft and extending between opposite first and second ends thereof. At the second end the internal passageway communicates with the sump. The rotatably-mounted motor shaft is coupled to the first end of the first-stage shaft. The motor shaft has an internal passageway defined along the longitudinal axis of the motor shaft and extending between opposite first and second ends thereof. At the second end thereof, the internal passageway of the motor shaft communicates with the internal passageway of the first-stage shaft at the first end thereof. The internal passageways of the motor shaft and first-stage gearbox shaft define a coolant path for liquid coolant, the coolant path beginning at the first end of the motor shaft and proceeding entirely through the internal passageways of the motor shaft and the first-stage shaft, and the coolant path terminating at the sump, where coolant exiting the internal passageway of the first-stage shaft at the second end thereof collects.

According to one feature of the invention, at least one sealing element is provided between the motor shaft and the first-stage shaft at the location where the motor shaft and the first-stage shaft are coupled, the at least one sealing element sealing against liquid coolant leakage.

According to another feature, the gearbox housing includes one or more fins positioned along the coolant path after the second end of the internal passageway of the first-stage shaft. The one or more fins increase the surface area over which the liquid coolant moves so as to increase heat dissipation.

BRIEF DESCRIPTION OF THE DRAWINGS

The invention is best understood from the following detailed description when read in connection with the accompanying drawings, of which.

WRITTEN DESCRIPTION

The terminology used herein is for the purpose of describing particular embodiments only and is not intended to be limiting of the invention. As used herein, the singular forms "a," "an," and "the" are intended to include the plural forms as well as the singular forms, unless explicitly stated otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
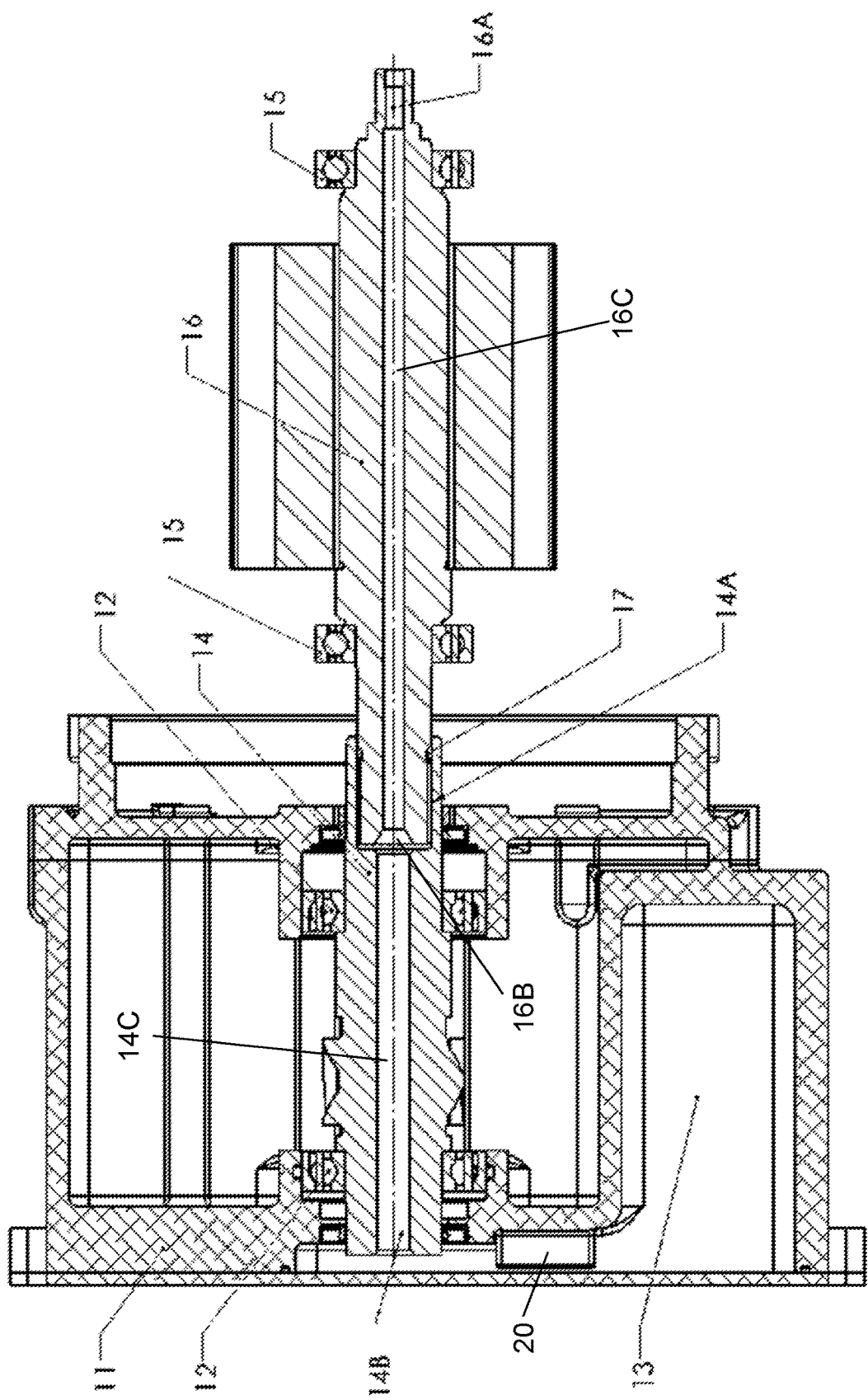
FIG. 1 is a cross-sectional view of the relevant portions of an electric motor according to the present invention.
Figure 2:
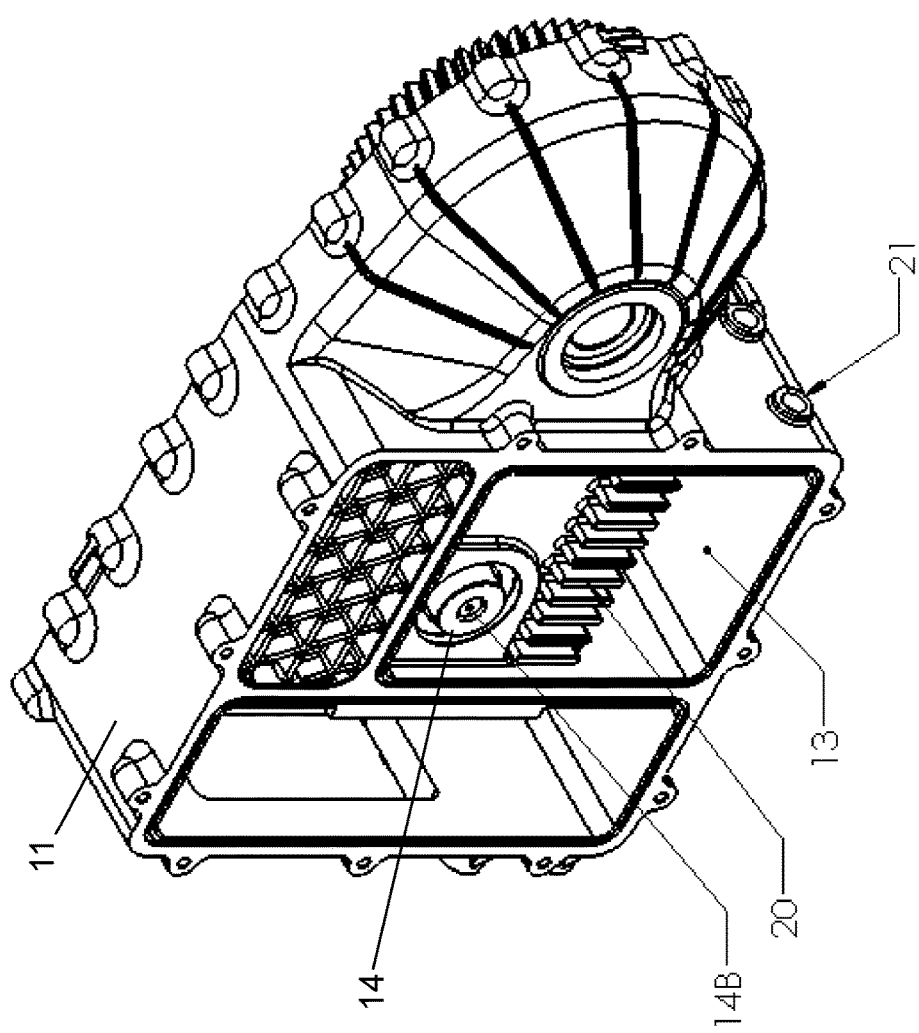
FIG. 2 is a perspective view of the gearbox housing of the illustrated embodiment, with the cover thereof removed to show the interior.

Referring now to the drawing, there is shown in FIGS. 1 and 2 the relevant portions of an electric motor comprising a gearbox housing 11 containing a gearbox, a sump 13, a first-stage shaft 14 rotatably mounted in the gearbox housing, and a rotatably-mounted motor shaft 16 coupled to the first-stage shaft of the gearbox.

The first-stage shaft 14 is rotatably supported on bearings 12 and has an internal passageway 14C defined along the longitudinal axis of the first-stage shaft and extending between opposite first 14A and second 14B ends thereof. At the second end 14B the internal passageway communicates with the sump 13.

Motor shaft 16 is rotatably supported on bearings 15 has an internal passageway 16C defined along the longitudinal axis of the motor shaft and extending between opposite first 16A and second 16B ends thereof. Motor shaft 16 is coupled to the first end 14A of the first-stage shaft 14, such as via coupling splines or other conventional means, in order that motor shaft 16 and first-stage shaft 14 rotate in unison.

An O-ring 17 is placed at the junction between the rotor 16 and the first stage shaft 14 for sealing purpose. Of course, those skilled in the art will appreciate that the O-ring 17 is an exemplary sealing means only and is not limiting of the sealing means that may be employed in the instant invention.

At the second end 16B thereof, the internal passageway 16C of the motor shaft 16 communicates with the internal passageway 14C of the first-stage shaft 14 at the first end 14A thereof.

The internal passageways of the motor shaft 16 and first-stage gearbox shaft 14 define a coolant path for liquid coolant (not shown), the coolant path beginning at the first end 16A of the motor shaft 16 and proceeding entirely through the internal passageways 16C and 14C, respectively, of the motor shaft and the first-stage shaft, and the coolant path terminating at the sump 13, where coolant exiting the internal passageway 14C of the first-stage shaft 14 at the second end 14B thereof collects.

Optionally, one or more surfaces comprising one or more fins 20 which are exposed to the liquid coolant as it enters the sump 13. Fins 20 serve to increase the surface area of the sump, thereby improving the dissipation of heat from the gearbox housing 11 via circulation of the liquid coolant.

Per convention, liquid coolant collected at the sump 13 is pumped or otherwise transported, via a return path, through a cooling means (e.g., an oil cooler where the liquid coolant is oil) and then to the beginning of the coolant path at first end 16A. More particularly according to the illustrated embodiment, once the liquid coolant exits the second end 14B, it passes over fins 20 en route to sump 13, where the liquid coolant collects before it exits at outlet port 21 as shown in FIG. 2. Per convention, outlet port 21 communicates with a pump (not shown) which pumps the liquid coolant through a heat exchanger (not shown) and back to the motor shaft 16 at the first end 16A thereof.

The coolant path of the present invention as described provides the shortest distance relative to the heat generation area of the bearings 12 and 15, thereby improving cooling in the motor. It also functions to provide cooling for the junction between the motor shaft and the first-stage shaft of the gearbox, as well as for the gearbox housing. The present invention also results in a low pressure drop through the coolant path, with high-efficiency cooling in respect of wattage per pressure drop.

Those skilled in the art having the benefit of the teachings of the present invention as set forth hereinabove, can effect numerous modifications thereto. These modifications are to be construed as being encompassed within the scope of the present invention as set forth in the appended claims.

The invention in which an exclusive property or privilege is claimed is defined as follows:

1. An electric motor comprising:
    a gearbox housing containing a gearbox, a sump, and a first-stage shaft rotatably mounted in the gearbox housing, wherein the first-stage shaft has an internal passageway defined along the longitudinal axis of the first-stage shaft and extending between opposite first and second ends thereof, and wherein at the second end the internal passageway communicates with the sump;
    a rotatably-mounted motor shaft coupled to the first end of the first-stage shaft, the motor shaft having an internal passageway defined along the longitudinal axis of the motor shaft and extending between opposite first and second ends thereof, and wherein at the second end the internal passageway of the motor shaft communicates with the internal passageway of the first-stage shaft at the first end thereof;
    wherein the internal passageways of the motor shaft and first-stage gearbox shaft define a coolant path for a liquid coolant, the coolant path beginning at the first end of the motor shaft and proceeding entirely through the internal passageways of the motor shaft and the first-stage shaft, and the coolant path terminating at the sump, where coolant exiting the internal passageway of the first-stage shaft at the second end thereof is collected.

2. The electric motor of claim 1, further comprising at least one sealing element between the motor shaft and the first-stage shaft at the location where the motor shaft and the first-stage shaft are coupled, the at least one sealing element sealing against liquid coolant leakage.

3. The electric motor of claim 1, wherein the gearbox housing includes one or more fins positioned along the coolant path after the second end of the internal passageway of the first-stage shaft, the one or more fins increasing the surface area over which the liquid coolant moves so as to increase heat dissipation.

* * * * *